2,939,867

REACTION PRODUCTS OF ALKYLENE DIHALIDES AND SUBSTITUTED PHENYLENEDIAMINES

Joseph C. Ambelang, Akron, Ohio, assignor to The Firestone Tire & Rubber Company, Akron, Ohio, a corporation of Ohio No Drawing. Filed Oct. 15, 1954, Ser. No. 462,623

3 Claims. (Cl. 260—293)

This invention relates to new chemical compounds which are useful in inhibiting or retarding the deteriorating action of ozone on rubber. The application includes the new compounds. Their use in rubber is covered in Serial No. 680,379, filed August 23, 1957.

The rubber compositions may be those used in tires, inner tubes, rubber thread and other products, including products obtained from latexes. The compositions consist essentially of vulcanizates of natural rubber or a sulfur-vulcanizable synthetic rubber as, for instance polymer of butadiene or an alkyl derivative thereof, or a copolymer of butadiene or an alkyl derivative thereof with a vinyl comonomer, or a mixture of sulfur-vulcanizable rubbers.

The inhibitors belong to the general class of trisubstituted phenylenediamines or, more particularly, the reaction products of alkylene dihalides of 1 to 8 carbon atoms with ortho- and para-phenylenediamines having the formula:

$$R_1R_2NC_6H_4NHR_3$$

in which $R_1$, $R_2$ and $R_3$ are each from the class consisting of alkyl, cycloalkyl, alkylcycloalkyl, hydroxyalkyl and hydroxycycloalkyl groups containing 1 to 20 carbon atoms, with the proviso that when $R_1$ and $R_2$ are joined as an alkylene group the alkylene group contains 2 to 10 carbon atoms. Two moles of the amine are reacted with one mole of the dihalide. These reaction products are of three general types, as will be more fully explained in what follows.

The deterioration of rubber is due to various factors and is evidenced in different ways. The inhibitors of this invention have been found to absorb or destroy ozone and thus prevent or inhibit its deteriorating action on rubber.

Oxygen and ozone both have a harmful effect on rubber, but the effect of each is different, and compounds which inhibit or prevent the harmful effect of one are not necessarily effective in stopping the harmful effect of the other.

Crabtree and Kemp in an article in Industrial and Engineering Chemistry, vol. 38, starting at page 278 (1946), explain the difference in the action of oxygen and ozone. The light-catalyzed oxidation which occurs during outdoor exposure forms a skin and crazed appearance over the exposed surface of the rubber. Ozone, even in very low concentration, cracks stretched rubber only (C. H. Leigh-Dugmore, Rubber Age and Synthetics, November and December 1952), and forms cracks perpendicular to the direction of stretch; such cracking can occur in the absence of light.

As a matter of fact, nearly all commercial rubber antioxidants are without effect in inhibiting the deterioration caused by ozone.

Natural rubber is used in the manufacture of the sidewalls of tires. The cracking of such sidewalls has long been a problem. It is a primary object of this invention to provide antiozone agents which prevent such cracking. However, the antiozone agents of this invention are not limited to that use but may be employed in treads, thread and other latex products, and other rubber products.

Tires are stressed when inflated. While a tire is at rest it is stretched statically, and on a moving vehicle it is stretched dynamically, i.e., it undergoes alternating stretching and relaxation. Some of the antiozone agents are more effective in static tests and others are more effective in dynamic tests. Antiozone agents effective under both conditions will be desired for tires, but for other rubber products an antiozone agent which does not meet both tests may be used.

The inhibiting effect of the antiozone agents in rubber was determined by treatment of unaged, cured stocks with air of controlled ozone content in specially designed equipment and also by outdoor exposure to natural weathering. The tests recorded herein were conducted with one-half inch dumbbell samples of approximately 100 gauge thickness. The special apparatus for testing with air of controlled ozone content and the method of testing therein are described in the articles by Ford and Cooper, appearing in India Rubber World for September and October 1951, entitled "A Study of the Factors Affecting the Weathering of Rubber-like Materials—I and II." The following reports of such tests give the ozone concentration maintained during each test at 60 parts per 100,000,000 parts of air, for 7 hours at 95° F. Two types of tests were conducted. In one type—called the dynamic test—the sample was repeatedly stretched between the limits of 0 and 20 percent elongation at the rate of 108 cycles per minute. In the other type of test—the static test—the samples were stretched at 12.5 percent elongation throughout the test. A combined dynamic and static test was used in obtaining the data reported in Table 1. No special lights were used in either test. On completion of each test the size of the cracks in each sample was compared visually with the size of the cracks in a blank which contains no antiozone agent and which was cured and tested at the same time as the test sample. The size was determined according to an arbitrary scale of measuring, with recordings of "very slight," "slight," "moderate," "severe," and "very severe"; and the frequency was recorded as "very few," "few," "moderate," "moderate-to-numerous," and "numerous."

The natural rubber stocks mentioned in the following tests were cured 45 minutes at 280° F., and the GR-S stocks were cured 60 minutes at 280° F. The reported results include data on the tensile properties of the cured rubber stocks before and after aging 2 days in an oven at 212° F. The modulus and tensile strength are given in pounds per square inch and the elongation is reported as percent of stretch at the break. These data are included to show that the antiozone agents have no substantial deleterious effect on the cure or upon the aging of the cured stocks. The formulae for the various test materials are given in "parts by weight."

In all of the test samples, both those tested in the special apparatus and those subjected to natural outdoor weathering, 2.0 parts by weight of the antiozone agent was added to the blank formula for each 100 parts by weight of the rubber present. Any substantial small amount may be employed, and this may vary, for example, from 0.2 part by weight to 10 parts by weight, depending upon the use to be made of the rubber composition.

PREPARATION OF THE ANTIOZONE AGENTS

In carrying out the reaction of the alkylene dihalide with the phenylenediamine the halide can react with either the disubstituted or the mono-substituted amino group of the phenylenediamine, or one of the halogens can react with one of the amino groups and the other halogen can react with the other amino group. Thus, we have the following general types of reaction products illustrated by reference to the reaction of either an alkylene dichloride or an alkylene dibromide with a trisubstituted ortho- or para-phenylenediamine:

(Type 1)

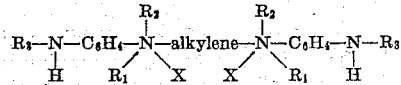

(Type 2)

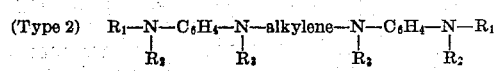

(Type 3)

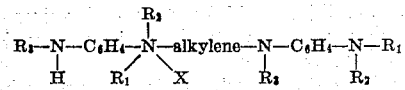

In the above formulas "X" is chlorine or bromine and the R's are as identified in the general formula, above, for the trisubstituted phenylenediamines.

The products of Type 1 are solid and insoluble or sparingly soluble in benzene. The products of Type 2 are liquid and readily soluble in benzene. It appears that when $R_1$ is methyl the Type 1 reaction proceeds much more rapidly than Type 2.

COMPOUNDS A1 AND A2

*Reaction product of N,N-dimethyl-N'-cyclohexyl-p-phenylenediamine*

Two products were obtained in this reaction, designated A1 and A2, which are representative of reaction Types 1 and 2, respectively.

One-tenth mole (21.8 g.) of p-cyclohexylaminodimethylaniline was dissolved in 10 ml. of benzene and 0.054 mole of ethylene dibromide. After standing three weeks at room temperature 16 grams of crystals had separated and were filtered off.

COMPOUND A1

The crystals from Example 1 were washed with benzene and air dried. The substance melted gradually between 156° and 172° C. It was soluble in cold methanol; insoluble in benzene and water.

*Analysis.*—Br: Found, 25.43; 25.22. Calculated for ethylene bis-(p-cyclohexylaminophenyl dimethyl-ammonium bromide) 26.6.

COMPOUND A2

The filtrate from Example 1 was heated to reflux on the steam bath with sodium carbonate solution approximately 6 hours, filtered, and the solvent distilled off in vacuo. The residue was a black oil, somewhat soluble in benzene. Molecular weight (cryscopic) found: 340. Calculated for N,N'(p-dimethylaminophenyl)-N,N'-dicyclohexyl-ethylenediamine: 464.

COMPOUND B

*Ethylene bis (i-propylaminophenyl dimethyl ammonium bromide)*

N,N-dimethyl-N'-i-propyl-p-phenylenediamine was mixed with ethylene dibromide as in the previous preparation, without solvent. After 11 days at room temperature, the reaction mixture had solidified and the odor of ethylene dibromide had disappeared. The brittle, resinous solid was soluble in methanol, but insoluble in toluene and ether. It was ground, moistened with methanol and washed with sodium bicarbonate solution. The tarry material obtained was shaken with ether and benzene, in which it was partially soluble. The two non-aqueous phases were combined and the solvent distilled off.

The product has the formula

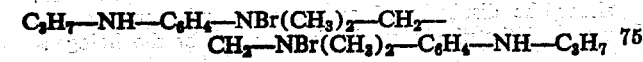

COMPOUND C

*Ethylene bis(p-undecylaminophenyl dimethyl ammonium bromide)*

One mole of N,N-dimethyl-N'-undecyl-p-phenylenediamine was mixed with 0.54 mole of ethylene dibromide and allowed to stand for two weeks. Thereafter it was heated on the steam bath for two and one-half hours. The product was a viscous, toluene-soluble syrup with a molecular weight of 1144, probably mostly of Type 1.

COMPOUND D

*N,N'-di-i-propyl-N,N'-di(p-dibutylaminophenyl) trimethylenediamine*

One-tenth mole of N,N-dibutyl-N'-i-propyl-p-phenylenediamine with 0.05 mole of trimethylene dibromide was stirred and heated on the steam bath with 0.05 mole of sodium carbonate in 50 ml. of water for 6 hours. The product was extracted with toluene, washed with water, dried over magnesium sulfate and the solvent distilled off. The residue had a molecular weight of 458. Analysis showed N=10.00, 10.02%. Calculated for N,N'-di-i-propyl-N,N'-di(p-dibutylaminophenyl)trimethylenediamine, N=9.94%; molecular weight=564.

In the following tables, the antiozone agents are identified by letters, as Compound A, B, etc., as in the foregoing preparations. Other alkylene dihalides and trialkyl phenylenediamines can be used in producing antiozone agents, as, for example:

*Alkylene dihalides*

Methylene dichloride and dibromide
Ethylene dichloride and dibromide
Propylene dichloride and dibromide
Trimethylene dichloride and dibromide
Butylene dichloride and dibromide
Tetramethylene dichloride and dibromide
Pentylene dichloride and dibromide
Hexamethylene dichloride and dibromide
Hexylene dichloride and dibromide
Octylene dichloride and dibromide
Methylethylene dichloride and dibromide

*Trialkyl phenylenediamines*

N,N-dimethyl-N'-hexyl-o- and p-phenylenediamines
N,N-dimethyl-N'-eicosyl-o- and p-phenylenediamines
N,N-dimethyl-N'-undecyl-o- and p-phenylenediamines
N,N-di-n-propyl-N'-cyclohexyl-o- and p-phenylenediamines
N,N-dimethyl-N'-ethyl-o- and p-phenylenediamines
N,N-dicyclohexyl-N'-methyl-o- and p-phenylenediamines
N,N-diamyl-N'-octyl-o- and p-phenylenediamines
N-methyl-N-ethyl-N'-i-propyl-o- and p-phenylenediamines
N,N-dibutyl-N'-sec-butyl-o- and p-phenylenediamines
N,N-diethyl-N'-sec-butyl-o- and p-phenylenediamines
N,N-ethylene-N'-(4-hydroxy-4-methyl-2-hexyl)-p-phenylenediamine
N,N-(gamma-i-amylpentamethylene)-N'-i-propyl-p-phenylenediamine The two last-named alkylene derivatives of phenylenediamine are prepared by the procedures outlined below. Ethylene dibromide is reacted with p-nitraniline, and the resulting condensate is reduced with iron and hydrochloric acid to N,N-ethylene-p-phenylenediamine; the latter compound is alkylated by reacting it with 2 molar proportions of 4-hydroxy-4-methyl-2-pentanone in a mixture of ethanol and glacial acetic acid, in the presence of the Adams platinum oxide catalyst, and under hydrogen at a pressure of 2 to 3 atmospheres; the alkylation mixture is shaken until the pressure drop indicates absorption of one molar proportion of hydrogen. The second derivative is prepared, starting with gamma-i-amylpiperidine, produced by condensing gamma-picoline with i-butyraldehyde and then reducing the condensate with hydrogen and a nickel catalyst; the piperidine derivative is condensed with p-nitrochlorobenzene, and the condensate is reduced with iron and hydrochloric acid; the resulting N,N-(gamma-i-amylpentamethylene)-p-phenylenediamine is alkylated by reacting it with 2-molar proportions of acetone in the presence of hydrogen and the Adams catalyst, as outlined above. The other tri-substituted phenylenediamines mentioned above are each prepared from the appropriate known N,N-disubstituted phenylenediamine by reaction with the appropriate ketone in the presence of hydrogen and the platinum catalyst.

The following test reports are given as illustrative of the effect of the antiozone agents referred to herein. In the reports the reaction products are identified by the letters used in the several preparations.

TABLE 1

|  | Control | Test 1 |
|---|---|---|
| Formula: |  |  |
| Smoked sheet | 100 | 100 |
| Oil softener | 4 | 4 |
| Stearic acid | 3 | 3 |
| Zinc oxide | 3 | 3 |
| Accelerator | 1 | 1 |
| Sulfur | 3 | 3 |
| EPC Black | 50 | 50 |
| Wax | 3 | 3 |
| Compound B |  | 2 |
| Total | 167 | 169 |
| Normal Properties: |  |  |
| 400% Modulus | 3,000 | 2,500 |
| Tensile | 3,850 | 3,725 |
| Elongation | 480 | 500 |
| Properties After Aging 2 Days at 212° F.: |  |  |
| Tensile | 2,075 | 1,575 |
| Elongation | 270 | 280 |
| Ozone Test in Artificial Weathering Machine Combined Static and Dynamic Test: |  |  |
| Crack size | Slight | Slight |
| Crack frequency | Numerous | Moderate |

The addition of Compound B reduced the number of ozone cracks in this stock.

TABLE 2

|  | Control | Test 2 |
|---|---|---|
| Formula: |  |  |
| Smoked sheet | 100 | 100 |
| Oil softener | 4 | 4 |
| Stearic acid | 3 | 3 |
| Zinc oxide | 3 | 3 |
| Accelerator | 1 | 1 |
| Sulfur | 3 | 3 |
| EPC Black | 50 | 50 |
| Wax | 3 | 3 |
| Compound C |  | 2 |
| Total | 167 | 169 |
| Normal Properties: |  |  |
| 400% Modulus | 2,900 | 2,750 |
| Tensile | 3,850 | 3,840 |
| Elongation | 480 | 510 |
| Properties After Aging 2 Days at 212° F.: |  |  |
| Tensile | 1,625 | 2,400 |
| Elongation | 270 | 320 |
| Ozone Test in Artificial Weathering Machine: |  |  |
| Static— |  |  |
| Crack size | Moderate | None |
| Crack Frequency | Moderate |  |
| Dynamic— |  |  |
| Crack size | Moderate | Very slight |
| Crack frequency | Numerous | Numerous |

The rubber vulcanizate containing Compound C showed improved resistance to ozone attack. In the static test it developed no visible cracks and only very slight cracks under dynamic conditions while the control vulcanizate developed moderate sized cracks under both static and dynamic conditions.

TABLE 3

|  | Control | Test 3 | Test 4 |
|---|---|---|---|
| Formula: |  |  |  |
| GR-S | 100 | 100 | 100 |
| HMF Black | 45 | 45 | 45 |
| Zinc oxide | 3 | 3 | 3 |
| Oil softener | 10 | 10 | 10 |
| Sulfur | 2 | 2 | 2 |
| Accelerator | 1.3 | 1.3 | 1.3 |
| Compound B |  | 2 |  |
| Compound C |  |  | 2 |
| Total | 161.3 | 163.3 | 163.3 |
| Normal Properties: |  |  |  |
| 300% Modulus | 1,550 | 1,450 | 1,575 |
| Tensile | 1,760 | 1,925 | 1,575 |
| Elongation | 320 | 380 | 300 |
| After Aging 4 Days at 212° F.: |  |  |  |
| Tensile | 1,325 | 1,500 | 1,375 |
| Elongation | 140 | 190 | 170 |
| Ozone Test in Artificial Weathering Machine: |  |  |  |
| Static (12.5% elongation)— |  |  |  |
| Crack size | Moderate | Slight | Slight |
| Crack frequency | Mod. to Num. | Moderate | Mod. to Num. |
| Dynamic (0-20% elongation)— |  |  |  |
| Crack size | Slight | V. Slight | V. Slight |
| Crack frequency | Numerous | Numerous | Numerous |

Ozone had less effect on the rubber strips containing Compounds B and C than on the control stock containing no antiozone agent.

TABLE 4

|  | Control | Test 5 |
|---|---|---|
| Formula: |  |  |
| GR-S | 100 | 100 |
| HMF Black | 45 | 45 |
| Zinc oxide | 3 | 3 |
| Oil softener | 10 | 10 |
| Sulfur | 2 | 2 |
| Accelerator | 1.3 | 1.3 |
| Compound A1 |  | 2 |
| Total | 161.3 | 163.3 |
| Normal Properties: |  |  |
| 300% modulus | 1,425 | 1,325 |
| Tensile | 2,200 | 2,275 |
| Elongation | 440 | 490 |
| After Aging 4 Days at 212° F.: |  |  |
| Tensile | 1,525 | 1,475 |
| Elongation | 160 | 240 |
| Ozone Test in Artificial Weathering Machine: |  |  |
| Static (12½% elongation)— |  |  |
| Crack size | Slight | None |
| Crack frequency | Numerous |  |
| Dynamic (0-20% elongation)— |  |  |
| Crack size | Slight | Very Slight |
| Crack frequency | Numerous | Numerous |

In both static and dynamic tests the rubber sample containing Compound A1 gave less evidence of ozone attack. In the static test, ozone cracks were absent from the strip containing the antiozone agent.

TABLE 5

| | Control | Test 6 |
|---|---|---|
| Formula: | | |
| GR-S | 100 | 100 |
| HMF Black | 45 | 45 |
| Zinc oxide | 3 | 3 |
| Oil Softener | 10 | 10 |
| Sulfur | 2 | 2 |
| Accelerator | 1.3 | 1.3 |
| Compound D | | 2 |
| Total | 161.3 | 163.3 |
| Normal Properties: | | |
| 300% Modulus | 1,450 | 1,400 |
| Tensile | 1,920 | 2,140 |
| Elongation | 380 | 430 |
| After Aging 4 Days at 212° F.: | | |
| Tensile | 1,625 | 1,900 |
| Elongation | 200 | 240 |
| Ozone Test in Artificial Weathering Machine: | | |
| Static (12½% Elongation)— | | |
| Crack size | Moderate | Slight |
| Crack frequency | Mod. to Num. | Very Few |
| Dynamic (0-20% Elongation)— | | |
| Crack size | Slight | Very Slight |
| Crack frequency | Numerous | Numerous |

Less severe cracking observed in the stock containing Compound D than in the control stock indicates that the added compound was an active antiozone agent.

By sulfur-vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including the dialkylamine polysulfides and reaction products of primary amines with excess sulfur. Known vulcanization accelerators are useful in speeding up the vulcanization process and operative herein, especially the relatively active accelerators including the thiazole sulfenamides, e.g., N-cyclohexyl-2-benzothiazolesulfenamide, thiazoline sulfenamides, thiocarbamyl sulfenamides, mercaptothiazoles, mercaptothiazolines, thiazolyl mono- and di-sulfides, the N,N-disubstituted dithiocarbamates, the thiuram sulfides, the xanthogen sulfides, and metallic salts of mercaptothiazoles or mercaptothiazolines or dithiocarbamic acids.

One or more accelerator activators is often used with any of the accelerators mentioned, and such activators include the various derivatives of guanidine known in the rubber art, amine salts of inorganic and organic acids, various amines themselves, and alkaline salts such as sodium acetate and the like, as well as other activators known in the art. Additionally, two or more accelerators or accelerator combinations are sometimes desirable in a single rubber compound. Many of the accelerators mentioned above are suitable in latex formulations, especially such common accelerators as piperidinium pentamethylene dithiocarbamate, zinc butylxanthate, zinc ethylxanthate, zinc salt of mercaptobenzothiazole, zinc dimethyldithiocarbamate, and zinc dibutyldithiocarbamate. Although vulcanization is usually accomplished by heating a vulcanizable rubber composition at a temperature in the range of 240 to 400° F. for a time ranging from several hours to a few seconds, vulcanization does take place at lower temperatures such as ordinary room temperature. It is quite common to vulcanize a latex film containing an ultra-accelerator by allowing the film to remain at room temperature for several hours or a few days.

What I claim is:

1. A compound of the formula

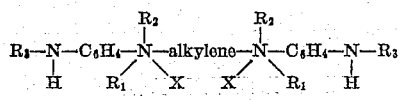

in which X is a halogen selected from the class consisting of bromine and chlorine; $R_1$ and $R_2$ are each selected from the class consisting of methyl, ethyl and propyl, and $R_1$ and $R_2$ may be joined as an alkylene group; $R_3$ is selected from the class consisting of cyclohexyl and alkyl groups containing 1 to 20 carbon atoms; and the

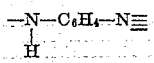

groups are selected from the class consisting of the ortho and para isomers.

2. The compound of claim 1 in which X is bromine.
3. The compound of claim 1 in which the alkylene group is ethylene.

References Cited in the file of this patent

UNITED STATES PATENTS

| | | |
|---|---|---|
| 1,673,801 | Chute | June 19, 1928 |
| 1,906,939 | Ter Horst | May 2, 1933 |
| 1,965,463 | Jones | July 3, 1934 |
| 2,128,945 | Jones | Sept. 6, 1938 |
| 2,261,002 | Ritter | Oct. 28, 1941 |
| 2,661,291 | Slifkin | Dec. 1, 1953 |
| 2,691,677 | Copp | Oct. 12, 1954 |
| 2,697,728 | Huebner | Dec. 21, 1954 |
| 2,705,224 | Hill et al. | Mar. 29, 1955 |